(12) United States Patent
Bennett et al.

(10) Patent No.: US 6,815,035 B2
(45) Date of Patent: Nov. 9, 2004

(54) POLYCARBONATE ARTICLES AND ADHESIVE COMPOSITION THEREFOR

(75) Inventors: Richard E. Bennett, Hudson, WI (US); Greggory S. Bennett, Hudson, WI (US); Michele A. Craton, Hudson, WI (US); Shih-Hung Chou, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/370,789

(22) Filed: Feb. 20, 2003

(65) Prior Publication Data

US 2003/0162031 A1 Aug. 28, 2003

Related U.S. Application Data

(62) Division of application No. 09/324,148, filed on Jun. 2, 1999, now Pat. No. 6,599,602.

(51) Int. Cl.⁷ .......................... B32B 25/20; B32B 27/30; B32B 27/36; C08F 26/06
(52) U.S. Cl. .................... 428/65.1; 428/65.2; 428/447; 428/483; 526/264
(58) Field of Search .......................... 526/264; 428/483, 428/447, 65.1, 65.2, 65.4

(56) References Cited

U.S. PATENT DOCUMENTS

| | | | |
|---|---|---|---|
| 3,728,148 A | 4/1973 | Pietsch et al. ........... 117/93.31 |
| 4,181,752 A | 1/1980 | Martens et al. ........... 427/54.1 |
| 4,334,233 A | 6/1982 | Murakami ............... 346/135.1 |
| 4,364,972 A | 12/1982 | Moon ........................ 427/54.1 |
| 4,410,978 A | 10/1983 | vanden Broek et al. .... 369/275 |
| RE31,533 E | 3/1984 | Lewis .......................... 428/65 |
| 4,503,531 A | 3/1985 | Kato ........................... 369/275 |
| 4,686,543 A | 8/1987 | Tani et al. .................. 346/137 |
| 4,726,982 A | 2/1988 | Traynor et al. ............. 428/213 |
| 4,812,541 A | 3/1989 | Mallya et al. .............. 526/264 |
| 4,812,633 A | 3/1989 | Vogelgesang et al. ...... 235/487 |
| 4,939,011 A | 7/1990 | Takahashi et al. ............ 428/64 |

(List continued on next page.)

FOREIGN PATENT DOCUMENTS

| | | |
|---|---|---|
| EP | 0 304 779 B1 | 3/1989 |
| EP | 0 330 197 A2 | 8/1989 |
| EP | 0 353 677 B1 | 2/1990 |
| EP | 0 855 703 A2 | 7/1998 |
| GB | 2 326 014 A | 12/1998 |
| JP | 3-203828 | 5/1991 |
| JP | 4-344344 | 11/1992 |
| JP | 8-96415 | 4/1996 |

(List continued on next page.)

OTHER PUBLICATIONS

Handbook of Pressure Sensitive Adhesive Technology, 2$^{nd}$ Edition, Ed. D. Satas, pp. 396–402.

(List continued on next page.)

*Primary Examiner*—Ramsey Zacharia

(57) ABSTRACT

An article is disclosed that includes:
 a) a first polycarbonate substrate;
 b) a second polycarbonate substrate; and
 c) an adhesive composition disposed between the first polycarbonate substrate and the second polycarbonate substrate such that the first polycarbonate substrate is bonded to said second polycarbonate substrate through the adhesive composition; the adhesive composition includes an adhesive polymer that includes the reaction product of
  1) an N-vinyl containing monomer selected from the group consisting of N-vinyl caprolactam, N-vinyl pyrrolidone, and N-vinylimidazole, and combinations thereof, and
  2) an acrylic acid ester monomer of a non-tertiary alcohol having an alkyl group that includes 4 to 20 carbon atoms.

22 Claims, 1 Drawing Sheet

U.S. PATENT DOCUMENTS

| | | | | |
|---|---|---|---|---|
| 4,983,505 A | | 1/1991 | Higuchi et al. | 430/495 |
| 5,059,462 A | | 10/1991 | Kurisu et al. | 428/64 |
| 5,077,120 A | | 12/1991 | Kato et al. | 428/200 |
| 5,079,047 A | * | 1/1992 | Bogaert et al. | 428/41.3 |
| 5,146,438 A | | 9/1992 | Harper | 369/13 |
| 5,151,310 A | | 9/1992 | Yanagisawa et al. | 428/64 |
| 5,197,060 A | | 3/1993 | Yatake | 369/283 |
| 5,244,775 A | | 9/1993 | Miwa et al. | 430/271 |
| 5,338,814 A | * | 8/1994 | Wu et al. | 526/210 |
| 5,401,610 A | | 3/1995 | Miwa et al. | 430/321 |
| 5,458,940 A | | 10/1995 | Woo | 428/64.3 |
| 5,462,977 A | | 10/1995 | Yoshikawa et al. | 522/160 |
| 5,487,926 A | | 1/1996 | Kuribayashi et al. | 428/33 |
| 5,502,085 A | | 3/1996 | Ohura et al. | 522/106 |
| 5,538,774 A | | 7/1996 | Landin et al. | 428/64.1 |
| 5,540,967 A | | 7/1996 | Toide et al. | 428/64.4 |
| 5,602,221 A | | 2/1997 | Bennett et al. | 526/307.7 |
| 5,616,670 A | | 4/1997 | Bennett et al. | 526/307.7 |
| 5,618,899 A | | 4/1997 | Appelt et al. | 526/264 |
| 5,623,000 A | | 4/1997 | Yoshikawa et al. | 522/16 |
| 5,639,811 A | * | 6/1997 | Plamthottam et al. | 524/272 |
| 5,654,387 A | | 8/1997 | Bennett et al. | 526/307.7 |
| 5,708,110 A | | 1/1998 | Bennett et al. | 526/307.7 |
| 5,756,584 A | | 5/1998 | Bennett et al. | 525/205 |
| 5,776,575 A | | 7/1998 | Hiraoka et al. | 428/64.1 |
| 5,858,498 A | | 1/1999 | Ohkubo et al. | 428/64.1 |
| 5,879,759 A | | 3/1999 | Zang | 427/505 |
| 5,935,673 A | | 8/1999 | Mueller | 428/64.1 |
| 5,936,934 A | | 8/1999 | Kuribayashi et al. | 369/286 |
| 5,951,806 A | | 9/1999 | Amo et al. | 156/273.5 |
| 5,982,740 A | | 11/1999 | Schwartz | 369/286 |
| 6,013,722 A | | 1/2000 | Yang et al. | 524/558 |
| 6,066,218 A | | 5/2000 | Kuhn et al. | 156/87 |
| 6,117,284 A | | 9/2000 | Mueller | 204/192.27 |
| 6,171,675 B1 | | 1/2001 | Iida | 428/64.4 |

FOREIGN PATENT DOCUMENTS

| | | |
|---|---|---|
| JP | 8-311418 | 11/1996 |
| JP | 10-275368 | 10/1998 |
| JP | 10-293946 | 11/1998 |
| JP | 10-306267 | 11/1998 |
| JP | 10306268 | 11/1998 |
| WO | WO 94/13750 | 6/1994 |
| WO | WO 95/29766 | 11/1995 |
| WO | WO 95/29811 | 11/1995 |
| WO | WO 96/05249 | 2/1996 |
| WO | WO 99/54116 | 10/1999 |

OTHER PUBLICATIONS

"Two–Sided Tape Used to glue DVDS Together", Denshi zairyo (Electronic Materials–Japanese) Jun. 1996.

ECMA, first Draft, "Standardizing Information and Communication Systems," 120 mm DVD—Read–only Disk, Jan. 1997, pp. ii, 13, 17–18, 29, 30.

Ghose et al., "Atomic Physicochemical Parameters for Three Dimensional Structure Directed Quantitative Structure–Activity Relationships III: Modeling Hydrophobic Interactions," Journal of Computational Chemistry, vol. 9, No. 1, pp. 80–90 (1988).

Nakamura et al., "Two–Sided Tape Used to Glue DVDs Together," Special Edition, DVD and the Main Technologies Behind It., pp. 1–11 and 46–49 (1996).

* cited by examiner

POLYCARBONATE ARTICLES AND ADHESIVE COMPOSITION THEREFOR

CROSS REFERENCE TO RELATED APPLICATION

This application is a divisional of U.S. application Ser. No. 09/324,148, filed Jun. 2, 1999, now U.S. Pat. No. 6,599,602, the disclosure of which is herein incorporated by reference.

BACKGROUND OF THE INVENTION

The invention relates to adhesives for polycarbonate and surface-coated polycarbonate substrates.

Digital versatile discs are examples of articles that include two polycarbonate substrates bonded together through an adhesive composition. One or both of the polycarbonate discs may contain data. To enable the data to be read by an optical reader, at least one of the polycarbonate discs has a metal-coated surface, e.g., a 50 nm coating of aluminum. The second polycarbonate disc often has a coating of aluminum, gold, silicon oxide, or silicon carbide.

One problem in selecting a suitable adhesive composition for the discs is the potential for polycarbonate to outgas, which makes it difficult for many adhesives to maintain the integrity of an initially formed bond between the adhesive and the surfaces of the discs. If debonding (i.e., adhesive failure and/or cohesive failure) is present, it can be difficult or impossible for the optical reader to read the data. In addition, many adhesive compositions contain chemical species that corrode the metal coating. The rate of corrosion and debonding tends to increase as humidity and temperature increase.

SUMMARY OF THE INVENTION

In one aspect, the invention features an article that includes: a) a first polycarbonate substrate, b) a second polycarbonate substrate, and c) an adhesive composition disposed between the first polycarbonate substrate and the second polycarbonate substrate such that the first polycarbonate substrate is bonded to the second polycarbonate substrate through the adhesive composition. The adhesive composition includes an adhesive polymer that includes the reaction product of 1) an N-vinyl containing monomer selected from the group consisting of N-vinyl caprolactam, N-vinyl pyrrolidone, and N-vinylimidazole, and combinations thereof, and 2) an acrylic acid ester monomer of a non-tertiary alcohol having an alkyl group comprising 4 to 20 carbon atoms. In some embodiments, the article is substantially free of debonding after being subjected to Accelerated Aging Test Method II.

In preferred embodiments, the article is substantially free of debonding after exposure to 90% relative humidity at 80° C. for 16 hours. In other embodiments, the adhesive composition is substantially free of bubbles after the article is exposed to 90% relative humidity at 80° C. for 16 hours.

In one embodiment, the article further includes an inorganic layer disposed on a surface of the first substrate and the adhesive composition is in contact with the inorganic layer. In some embodiments, the inorganic layer is a metal. Example of suitable metals include aluminum, silver, brass, gold, gold alloy, copper, copper-zinc alloy, copper-aluminum alloy, aluminum-molybdenum alloy, aluminum-tantalum alloy, aluminum-cobalt alloy, aluminum-chromium alloy, aluminum-titanium alloy, and aluminum-platinum alloy and combinations thereof. In some embodiments, the metal layer is reflective to light having a wavelength from 375 nm to 850 mm.

In another embodiment, the metal layer is substantially free of corrosion after the article is subjected to Accelerated Aging Test Method II. In a preferred embodiment, the metal layer is substantially free of corrosion after the article is exposed to 90% relative humidity at 80° C. for 16 hours, most preferably the metal layer is substantially free of corrosion after the article is exposed to 90% relative humidity at 80° C. for 1000 hours. In other embodiments, the metal layer is substantially free of corrosion after the article is exposed to 85% relative humidity at 80° C. for 100 hours.

In some embodiments, the inorganic layer is semi-transparent. In other embodiments, the inorganic layer is selected from the group consisting of gold and $Si_nX_m$, where X is selected from the group consisting of oxygen, nitrogen, carbon, and combinations thereof, and $\Sigma(n+m)$ satisfies the valence requirements of Si and X.

In one embodiment, the article further includes a metal layer disposed on a surface of the first substrate, and an inorganic layer disposed on a surface of the second polycarbonate substrate, such that the adhesive composition is in contact with the metal layer of the first substrate and the inorganic layer of the second substrate.

In preferred embodiments, the article is optically clear. In other preferred embodiments, the adhesive composition is optically clear.

In some embodiments, the article is an optical recording medium. The optical recording medium can include data and preferably includes a storage capacity greater than one gigabyte. Examples of suitable optical recording media include DVD, DVD-R, DVD-RW, DVD-RAM, DVR, DVD Audio and DVD hybrids.

In another aspect, the invention features an article that includes: a) a first polycarbonate substrate, b) a second polycarbonate substrate, and c) an adhesive composition disposed between the first polycarbonate substrate and the second polycarbonate substrate such that the first polycarbonate substrate is bonded to the second polycarbonate substrate through the adhesive composition. The adhesive composition includes an adhesive polymer consisting of the reaction product of 1) an N-vinyl containing monomer selected from the group consisting of N-vinyl caprolactam, N-vinyl pyrrolidone, N-vinylimidazole, and combinations thereof, 2) an acrylic acid ester monomer of a non-tertiary alcohol having an alkyl group comprising 4 to 20 carbon atoms, whose homopolymer has a Tg less than 0° C., 3) optionally a monoethylenically unsaturated monomer having from 4 to 20 carbon atoms in the alkyl group, whose homopolymer has a Tg of greater than 10° C., 4) optionally a substituted acrylamide, 5) optionally an initiator, 6) optionally a cross-linking agent, and 7) optionally a chain transfer agent.

In other aspects, the invention features an adhesive composition that includes an adhesive polymer consisting of the reaction product of 1) greater than 30 parts by weight N-vinyl caprolactam (based on 100 parts adhesive polymer), 2) an acrylic acid ester monomer of a non-tertiary alcohol having an alkyl group comprising 4 to 20 carbon atoms, whose homopolymer has a Tg less than 0° C., 3) optionally a monoethylenically unsaturated monomer having from 4 to 20 carbon atoms in the alkyl group, whose homopolymer has a Tg of greater than 10° C., 4) optionally a substituted acrylamide, 5) optionally an initiator, 6) optionally a cross-linking agent; and 7) optionally a chain transfer agent.

In one embodiment, the composition is capable of maintaining a first polycarbonate substrate in fixed relation to a second polycarbonate substrate to form an article that is substantially free of debonding after the article is subjected to Accelerated Aging Test Method II.

In another embodiment, the adhesive composition is capable of bonding a first polycarbonate substrate to a second polycarbonate substrate to form an article that is substantially free of debonding after exposure to 90% relative humidity at 80° C. for 16 hours.

In other embodiments, the composition is capable of bonding a first polycarbonate substrate that includes a metal layer disposed on a surface of the polycarbonate, to a second polycarbonate substrate to form an article that is substantially free of corrosion after exposure to 90% relative humidity at 80° C. for 16 hours.

In some embodiments, the adhesive composition has a storage modulus of at least about $2 \times 10^5$ Pa at room temperature.

In one embodiment, the amount of the N-vinyl caprolactam is from about 33 parts by weight to about 50 parts by weight. In other embodiments, the acrylic acid ester monomer is selected from the group consisting of isooctyl acrylate, 2-ethylhexyl acrylate, isononyl acrylate, isodecyl acrylate, decyl acrylate, lauryl acrylate, hexyl acrylate, butyl acrylate, octadecyl acrylate, and combinations thereof.

In preferred embodiments, the adhesive composition is optically clear. In some embodiments, the adhesive composition is optically clear when disposed between a first polycarbonate substrate and a second polycarbonate substrate and then exposed to 90% relative humidity at 80° C. for 16 hours.

In other aspects, the invention features an article that includes a first polyethylene terephthalate substrate comprising silicone disposed on a surface thereof, a second polyethylene terephthalate substrate comprising silicone disposed on a surface thereof, wherein the first substrate is different from the second substrate, and a pressure sensitive adhesive composition according to the above-described adhesive composition disposed between the first substrate and the second substrate.

In a further, aspect the invention features an article that includes a first polycarbonate substrate, a second polycarbonate substrate, and an adhesive composition disposed between the first polycarbonate substrate and the second polycarbonate substrate such that the first polycarbonate substrate is bonded to the second polycarbonate substrate through the adhesive composition, the article being substantially free of debonding after exposure to 85% relative humidity at 80° C. for 100 hours. In a preferred embodiment, the first polycarbonate substrate includes data and a metal layer disposed on a surface of the first polycarbonate substrate, and the data is capable of being read according to the DVD Performance Test after exposure to 85% relative humidity at 80° C. for 100 hours.

In another embodiment, the article includes a first polycarbonate substrate, a second polycarbonate substrate, and a pressure sensitive adhesive composition disposed between the first polycarbonate substrate and the second polycarbonate substrate such that the first polycarbonate substrate is bonded to the second polycarbonate substrate through the adhesive composition, and the article is substantially free of debonding after exposure to 90% relative humidity at 80° C. for 16 hours.

In other aspects, the invention features an article that includes: a) a first polycarbonate substrate, b) a second polycarbonate substrate, and c) an adhesive composition disposed between the first polycarbonate substrate and the second polycarbonate substrate such that the first polycarbonate substrate is bonded to the second polycarbonate substrate through the adhesive composition and the adhesive composition includes an adhesive polymer consisting of the reaction product of 1) a nitrogen containing monomer that is copolymerizable with an acrylic acid ester monomer and whose AlogP value is $\leq 1.0$, 2) an acrylic acid ester monomer of a non-tertiary alcohol having an alkyl group comprising 4 to 20 carbon atoms, whose homopolymer has a Tg less than 0° C., 3) optionally a monoethylenically unsaturated monomer having from 4 to 20 carbon atoms in the alkyl group, whose homopolymer has a Tg of greater than 10° C., 4) optionally a substituted acrylamide, 5) optionally an initiator; 6) optionally a cross-linking agent, and 7) optionally a chain transfer agent. In other embodiments, the nitrogen containing monomer has $0.0 \leq AlogP \leq 1.0$. In other embodiments, the acrylic acid ester monomer has an AlogP value greater than 1.0.

In another aspect, the invention features a method of making the above-described polycarbonate article. The method includes contacting the first polycarbonate substrate with the adhesive composition, and contacting the adhesive composition with the second polycarbonate substrate such that the first polycarbonate substrate becomes bonded to the second polycarbonate substrate through the adhesive composition.

The invention provides an adhesive composition that is optically clear and exhibits excellent bond strength to polycarbonate substrates such that it maintains the bond under extreme conditions of elevated relative humidity (about 90%), and elevated temperature (about 80° C.). The adhesive composition also provides a bond to polycarbonate of excellent durability. The bond integrity and the optical clarity are also maintained when cooled to room temperature after exposure to such conditions. The adhesive composition is non-corrosive and is particularly well-suited for use in articles that have corrodible surfaces such as articles that include two polycarbonates substrates in which one or both of the substrates has a surface coating such as aluminum. The adhesive composition also exhibits good adhesion to surfaces such as silicon carbide, silicon nitride, and silicon oxide-coated polycarbonate substrates. The adhesive composition can be used in a variety of articles including, e.g., digital versatile discs, e.g., digital video discs, memory switches, vibration dampers, copper circuitry, and multi-layer polycarbonate articles, e.g., windows, as well as in general bonding applications.

Other features of the invention will be apparent from the following description of preferred embodiments thereof, and from the claims.

DETAILED DESCRIPTION

Figure 1:
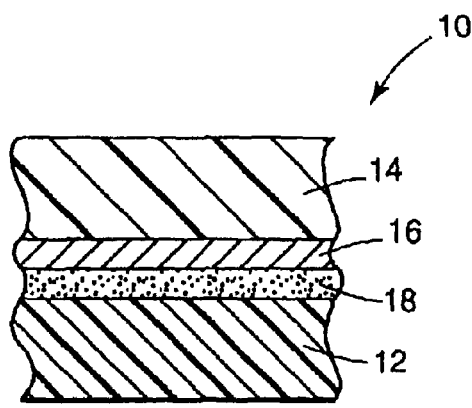
FIG. 1 is a cross-sectional view of a polycarbonate article.

FIG. 1 is an example of a polycarbonate article 10 that includes a first polycarbonate substrate 12 bonded to a second polycarbonate substrate 14 through an adhesive composition 18. The polycarbonate article may take a variety of forms including that of an optical recording medium such as, e.g., a digital versatile disc (DVD), e.g., DVD, DVD-R, DVD-RW, DVD-RAM, DVD Audio, DVR and DVD hybrids. The formats for DVDs have been defined by an industry consortium (ECMA, Executive Committee of DVD Consortium as ECMA/TC 31/97/2, Geneva Switzerland, January 1997). DVDs can be divided into DVD-ROMs, which are exclusively for reproduction, DVD-RAMs, which can be used for data storage, and DVD-Rs, which are recordable once (write once, read many). The term "DVR" is an acronym for "Digital Video Recordable" disc. Using a light beam (light radiation) information can be read out from a DVR and/or information can be recorded to a DVR.

The polycarbonate substrate of the article can be in a variety of dimensions and shapes including, e.g., a disc, and can include data molded into the polycarbonate substrate. Useful polycarbonate substrates can also include an inorganic surface layer 16 as shown in FIG. 1. The inorganic surface layer can include, e.g., metal (e.g., aluminum, silver, brass, gold, a gold alloy, copper, a copper-zinc alloy, a copper-aluminum alloy, an alloy that includes aluminum and a refractory metal, e.g., molybdenum, tantalum, cobalt, chromium, titanium and platinum), $Si_nX_m$, where X is oxygen, nitrogen, or carbon, and $\Sigma(n+m)$ satisfies the valence requirements of Si and X (e.g., silicon oxide and silicon carbide), and combinations thereof. The inorganic surface layer may be semi-transparent, i.e., exhibits a reflectivity of from 18 to 30% as measured according to the ECMA Standard Reflectivity Test Method for 210 mm DVD-ROM. Gold, silicon oxide, and silicon carbide are examples of compounds that are used to form semi-transparent layers on polycarbonate surfaces.

Examples of commercially available polycarbonate substrates include the polycarbonate discs used in digital versatile discs. The disc-shaped substrates can have a center hole, which is useful for centering the DVD's that are assembled therefrom in a recording or playing station. The disc-shaped substrates can include an outer diameter of about 50 to about 360 mm, an inner diameter of about 5 to 35 mm, and a thickness of between about 0.25 and 1.0 mm.

The adhesive composition is formulated to maintain adhesion to the above-described polycarbonate substrates under conditions of prolonged high humidity and high temperature. In particular, the adhesive composition is capable of maintaining two such polycarbonate substrates in fixed relation to each other during and after being subjected to Accelerated Aging Test Method II (preferably after exposure to 80° C. and 90% relative humidity for a period of 16 hours, more preferably after exposure to these conditions after 100 hours, most preferably after exposure to these conditions for 1000 hours). The adhesive composition is also formulated such that the bonded article made therefrom is substantially free of debonding after exposure to the afore mentioned conditions. By "substantially free of debonding" it is meant that, to the extent that adhesive failure at the substrate/adhesive interface, cohesive failure of the adhesive composition or a combination thereof exists, the bonded article remains capable of being used for its intended purpose. With respect to a digital versatile disc, for example, to the extent that debonds exist, the disc maintains its data storage and reading functions (i.e., the disc can be read by an optical reader).

Preferably the adhesive composition is formulated such that when employed in a bonded article such as an optical recording media, e.g., a digital versatile disc, the article can be read, for example, by a DVD200MG Data Analyzer (C. D. Associates Inc., Irvine, Calif.), according to the DVD Performance Test Method set forth in the Examples section below, after the article has been exposed to 80° C. and 85% relative humidity for a period of 16 hours, more preferably after exposure to these conditions for 100 hours, most preferably after exposure to these conditions for 1000 hours.

The adhesive composition is also preferably noncorrosive such that when the composition is adhered to one or more substrates that include a corrodible surface, e.g., metal surface layers, the bonded article, after exposure to prolonged conditions of high humidity and high temperature, is substantially free of corrosion and debonding. Corrosion can be detected in the bonded article by viewing the article with the human eye under normal lighting conditions, including directing a light so that it will pass through the substrate in areas where corrosion has occurred. Corrosion is present in areas that appear to exhibit an absence of corrodible layer where the corrodible layer had previously existed on the article. By "substantially free of corrosion" it is meant that to the extent corrosion is present, the article remains capable of being used for its intended purpose. Preferably the bonded article is substantially free of corrosion after exposure to 80° C. and 90% relative humidity for a period of 16 hours, more preferably after exposure to these conditions for 1000 hours.

The adhesive composition is also preferably optically clear when viewed by the human eye under normal lighting conditions. Preferably the adhesive composition exhibits at least about 90% transmittance at 650 nm and at a coating thickness of less than about 60 μm, and maintains its optical clarity after exposure to the afore mentioned conditions. It is preferred that the adhesive composition be free of haze, i.e., the whitening of an originally clear adhesive as observed by the eye under standard lighting conditions, which can impair the optical clarity of the adhesive composition, and therefor the ability of an article made therewith to perform as intended. It is also preferred that the adhesive composition be free of bubbles, i.e., gaseous inclusions, which can impair the optical clarity of the adhesive composition, and the ability of an article made therewith to perform as intended. The adhesive composition can be formulated to exhibit optically clarity after exposure to extreme humidity and temperature conditions.

The adhesive composition can also be formulated to impart additional rigidity to an article bonded therewith, preferably sufficient rigidity to render the article suitable for its intended purpose. One measure of the ability of the adhesive composition to maintain adhesion to a substrate, and to impart sufficient rigidity to an article bonded therewith so as to render the article suitable for its intended purpose, is its storage modulus (G'). Preferably the adhesive composition exhibits a room temperature storage modulus of at least about $2\times10^5$ Pascal (Pa) when measured according to the Storage Modulus Test Method.

The adhesive composition includes an adhesive polymer that includes the reaction product of N-vinyl containing monomer (preferably at least about 30 parts by weight, more preferably at least about 33 parts by weight, more preferably from about 33 parts by weight to about 50 parts by weight), an acrylic acid ester monomer of a non-tertiary alcohol having an alkyl group of from 4 to 20 carbon atoms and, optionally, a monoethylenically unsaturated modulus reinforcing monomer having a homopolymer whose glass transition temperature (Tg) is greater than 10° C. (more preferably greater than 25° C.), a substituted acrylamide, an initiator, a crosslinking agent, a chain transfer agent, and combinations thereof. When bonding two polycarbonate substrates together, or when adhering a first metallized polycarbonate substrate to a second polycarbonate substrate, the adhesive polymer preferably consists of the reaction product of at least about 33 parts by weight N-vinyl containing monomer, the acrylic acid ester monomer, and a photoinitiator. When adhering a first metallized polycarbonate substrate to a second inorganic surface coated polycarbonate substrate, the adhesive polymer preferably consists of the reaction product of at least about 30 parts by weight N-vinyl containing monomer, the acrylic acid ester monomer, and a photoinitiator.

The N-vinyl containing monomer preferably has a AlogP value (i.e., the log of the water-octanol partition coefficient)

that is less than 1.0, preferably $0.00 \leq AlogP \leq 1.0$. Preferred N-vinyl containing monomers include N-vinyl caprolactam, N-vinyl pyrrolidone, and N-vinylimidazole.

The acrylic acid ester monomer preferably has an AlogP value that is greater than 1.0. The preferred acrylic acid ester monomer is a monofunctional acrylic acid ester monomer of a non-tertiary alkyl alcohol having from 4 to 20 carbon atoms (preferably from 4 to 18 carbon atoms, more preferably 4 to 14 carbon atoms), whose homopolymer has a Tg less than 0° C. (preferably less than about −20° C.). Included in this class of acrylic acid ester monomers are 2-methylbutyl acrylate, isooctyl acrylate, 4-methyl-2-pentyl acrylate, isoamyl acrylate, sec-butyl acrylate, n-butyl acrylate, 2-ethylhexyl acrylate, isononyl acrylate, isodecyl acrylate, isodecyl methacrylate, n-decyl acrylate, lauryl acrylate, n-octyl acrylate, n-hexyl acrylate, butyl acrylate, octadecyl acrylate, and combinations thereof.

The monoethylenically unsaturated monomer having a homopolymer Tg greater than 10° C. (more preferably greater than 25° C.) is preferably suitable for reinforcing (i.e., increasing) the modulus of the adhesive composition. Examples of suitable monoethylenically unsaturated monomers having a homopolymer Tg of greater than 10° C. include monofunctional unsaturated monomers. Examples of such monomers include methylacrylate, ethylacrylate, methylmethacrylate, ethyl methacrylate, vinyl acetate, vinyl propionate, 2-(phenoxy)ethyl acrylate or methacrylate, and combinations thereof. Nonpolar monomers such as isobornyl acrylate may also be used.

Examples of suitable substituted acrylamides include t-butyl acrylamide and diacetone acrylamide. Preferably the amount of substituted acrylamide included in the reaction to produce the adhesive polymer is from 0 to 9 parts by weight based on 100 parts adhesive polymer.

The monomer mixture can be polymerized by various conventional free radical polymerization methods, whether thermally or radiation initiated, including, e.g., solvent polymerization, emulsion polymerization, bulk polymerization and radiation polymerization including processes using ultraviolet light, electron beam radiation, and gamma radiation.

Solution polymerization involves combining the monomer components along with a suitable inert organic solvent and a free radically copolymerizable crosslinking agent in a reaction vessel. After the monomer mixture is charged to the reaction vessel, a concentrated thermal free radical initiator solution is added. The reaction vessel is then purged with nitrogen to create an inert atmosphere. Once purged, the reaction vessel is sealed, and the solution within the vessel is heated to the activation temperature of the initiator. The mixture is stirred during the course of the polymerization reaction to produce the adhesive composition. Solvent polymerization is well known in the art and described in various sources such as U.S. Pat. No. Re 24,906 (Ulrich), and U.S. Pat. No. 4,554,324 (Husman et al.).

Emulsion polymerization is also described in U.S. Pat. No. Re 24,906 in which the monomers are added to distilled water with an emulsifying agent and suitable initiators in a reaction vessel, purged with nitrogen, and heated, typically to a temperature in the range of about 25° to 80° C., until the reaction is completed.

The adhesive composition can also be prepared by bulk polymerization methods in which the adhesive composition, including the monomers and a free radical initiator, is coated onto a flat substrate such as a polymeric film, and exposed to an energy source in a low oxygen atmosphere, i.e., less than 1000 parts per million (ppm), and preferably less than 500 ppm, until the polymerization is substantially complete. Alternatively, a sufficiently oxygen free atmosphere can be provided by enclosing the composition with, for example, a polymeric film, or enveloping the composition within a packaging material, e.g., a pouch. In one embodiment, the film can be overlaid on top of the coated adhesive composition before polymerization. In another embodiment, the adhesive composition is placed in pouches, which can be optionally sealed, and then exposed to energy, such as heat or ultraviolet radiation to form the adhesive.

The preferred polymerization method includes a two step free radical polymerization of 100% solids monomer mixture. In the first step, the low viscosity monomers are mixed at the appropriate ratios and an initiator is added to the mixture. The mixture is purged with nitrogen to remove dissolved oxygen. The composition is partially polymerized to produce a syrup with moderate viscosity that can be coated easily. Further initiator and, optionally, a crosslinking agent, an additional monomer, and combinations thereof, are added to the syrup. The syrup is then coated (while excluding oxygen) at a desired thickness. During or after the coating process the syrup is further exposed to energy to complete the polymerization and crosslink the adhesive composition. The free radical polymerization is preferably performed by ultraviolet radiation.

Polymerization methods can also employ thermal radiation. The composition includes a thermal initiator and can be coated onto a release treated film and covered with a second release treated film. The composite is then placed in a heat transfer fluid and heated to a temperature sufficient to effect polymerization.

Useful free radical initiators include thermal and photoactive initiators. The type of initiator used depends on the polymerization process. Preferably the initiator is a photoinitiator and is capable of being activated by UV radiation, e.g., at wavelengths from about 250 nm to about 450 nm, more preferably at about 351 nm. Useful photoinitiators include, e.g., benzoin ethers such as benzoin methyl ether and benzoin isopropyl ether, substituted benzoin ethers such as anisoin methyl ether, substituted acetophenones such as 2,2-dimethoxy-2-phenylacetophenone, and substituted alpha-ketols such as 2-methyl-2-hydroxypropiophenone. Examples of commercially available photoinitiators include Irgacure 819 and Darocur 1173 (both available form Ciba-Geigy Corp., Hawthome, N.Y.), Lucern TPO (available from BASF, Parsippany, N.J.) and Irgacure 651, which is available from Ciba-Geigy corporation and is believed to be 2,2-dimethoxy-1,2-diphenylethane-1-one. Also useful are copolymeric photoinitiators.

Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO 64 (2,2'-azo-bis(isobutyronitrile)) and VAZO 52, and Lucidol 70 from Elf Atochem North America, Philadelphia, Pa.

The initiator is used in an amount effective to facilitate polymerization of the monomers and the amount will vary depending upon, e.g., the type of initiator, the molecular weight of the initiator, the intended application of the resulting adhesive composition and the polymerization process. The initiators can be used in amounts from about 0.001 part by weight to about 5 parts by weight based on 100 parts adhesive polymer. Preferred amounts range from about 0.05 part by weight to about 3 parts by weight.

The adhesive composition may be crosslinked to achieve a desired storage modulus, although the adhesive composition preferably exhibits the desired storage modulus in the absence of crosslinking. Crosslinking can be achieved without a crosslinking agent by using high energy electromagnetic radiation such as gamma or electron beam radiation. In addition, a crosslinking agent, or a combination of crosslinking agents can be added to the mixture of polymerizable monomers to facilitate crosslinking and to achieve the desired storage modulus for the adhesive composition. The degree of crosslinking in the adhesive composition can be such that the gel fraction of the adhesive composition is at least about 95%.

Useful cross-linking agents for radiation curing, include multifunctional acrylates, such as those disclosed in U.S. Pat. No. 4,379,201 (Heilmann et al.), which include 1,6-hexanediol diacrylate, trimethylolpropane triacrylate, 1,2-ethylene glycol diacrylate, pentaerythritol tetracrylate, 1,12-dodecanol diacrylate, and combinations thereof, and co-polymerizable aromatic ketone co-monomers such as those disclosed in U.S. Pat. No 4,737,559 (Kellen et al.). Various other crosslinking agents with different molecular weights between (meth)acrylate functionality would also be useful. Suitable ultraviolet light sources are, e.g., medium pressure mercury lamps and ultraviolet black light.

Generally, when a crosslinking agent is used, the crosslinking agent is present in an amount of about 0.01 part to about 0.50 part by weight based on 100 parts adhesive polymer, preferably about 0.05 part by weight to about 0.3 part by weight crosslinking agent.

Preferred chain transfer agents have a non-corrosive effect on the metallized surface of a polycarbonate substrate, and are soluble in the monomer mixture prior to polymerization. Examples of suitable chain transfer agents include triethyl silane and mercaptans.

The adhesive composition is preferably in the form of a layer of curable liquid or film (e.g., a pressure sensitive adhesive film) at the surface of the substrate. The thickness of the adhesive coating is sufficient to permit polycarbonate substrates to bond to each other through the adhesive composition. The thickness of the adhesive coating may vary depending on the application. For digital versatile discs, e.g., the thickness is preferably from about 50 $\mu$m to about 75 $\mu$m, more preferably from about 55 $\mu$m to about 65 $\mu$m.

The adhesive composition may be coated onto a release-treated surface, e.g., a release liner, and then laminated to a surface of a polycarbonate substrate. Alternatively, the adhesive composition may be applied directly to a surface of the polycarbonate substrate, followed by polymerization of the adhesive composition and, optionally, a release treated surface can then be laminated to the adhesive composition. When the adhesive composition is provided in the form of a film, it preferably is sandwiched between two release liners where one of the release liners has a release coating that exhibits a lesser degree of adhesion to the adhesive film relative to the release coating of the second release liner. Examples of useful commercially available polyethylene terephthalate (PET) backed-silicone release compound treated release liners include silicone treated PET release liners available under the trade designations P-10 and T-50 from CPFilms, Martinsville, Va.

In addition to the above-described polycarbonate substrates, a variety of substrates can be bonded to each other through the adhesive composition including, e.g., ethylene vinyl acetate, PET, oriented polypropylene, glass, and combinations thereof. Preferably the adhesive composition is formulated to maintain adhesion to two substrates of a bonded article where the substrates are ethylene vinyl acetate, PET, oriented polypropylene, glass and combinations thereof, after the bonded article has been aged for sixteen hours at 85° C. and 85% relative humidity.

The invention will now be described further by way of the following examples. All parts, ratios, percents and amounts stated in the Examples are by weight unless otherwise specified.

EXAMPLES

Test Procedures

Test procedures used in the examples include the following.

Accelerated Aging Test Method I

A sample is placed in an oven at 80° C. and 90% relative humidity for 16 hours. Upon completion of the aging cycle, the sample is visually examined at test temperature and during and upon cooling to room temperature for haze, bubbles, pinholes, corrosion, and debonding.

Bubbles are recorded if there is a gaseous inclusion within the mass of adhesive.

Pinholes are recorded if there are very small areas in the reflective layer that are transmissive to visible light. These are often present in the virgin reflective layer (i.e., prior to the presence of the adhesive composition). It may be necessary to illuminate or backlight the reflective layer to observe the pinholes.

Corrosion is recorded if there are areas in the reflective layer that are transmissive to visible light. The areas of corrosion are initially larger in size than the pinholes and continue to increase in size, often leading to the complete disappearance of the reflective layer of a bonded assembly.

Debonding occurs if the adhesive composition separates from one or more of the substrates.

Accelerated Aging Test Method II

A sample is placed in an oven at 95% relative humidity where it is subjected to six cycles in which each cycle includes increasing the oven temperature from 25+/-3° C. to 40+/-2° C. and then holding the oven temperature at 40+/-2° C. for a period of 12 hours followed by decreasing the oven temperature from 40+/-2° C. to 25+/-3° C. and then holding the oven temperature at 25+/-3° C. over a period of 12 hours. Upon completion of the six cycle aging test, the sample is examined at test temperature and during and upon cooling to room temperature for haze, bubbles, pinholes, corrosion, and debonding.

90° Peel Strength Test Method

The peel strength of the adhesive composition is measured as follows. An adhesive film provided on a release liner is prepared by removing the release liner to expose the adhesive composition. A piece of 0.05 mm (2 mil) aluminum foil is placed on the exposed adhesive surface. Using a 102 mm×51 mm (4"×2") plastic squeegee, the aluminum foil is adhered to the adhesive by applying hand pressure, while ensuring that no air bubbles or wrinkles are introduced into the test specimen. The remaining exposed adhesive surface is then adhered to a clean dry piece of test surface (1.3 cm wide). Peel strength measurements are then made using a 90° peel mode at 30.5 cm/min.

180° Peel Strength Test Method

The peel strength of the adhesive composition is measured according to ASTM D3330-90 (Reapproved 1994) Test Method B. Briefly, an adhesive film provided on a release liner is prepared by removing the release liner to expose the adhesive composition. A piece of 0.05 mm (2 mil) aluminum foil is placed on the exposed adhesive surface. Using a 102 mm×51 mm (4"×2") plastic squeegee, the aluminum foil is adhered to the adhesive by applying hand pressure while ensuring that no air bubbles or wrinkles are introduced into the test specimen. The remaining exposed adhesive surface is then adhered to a clean dry piece of test surface (1.3 cm wide). Peel strength measurements are then made using a 180° peel mode at 30.5 cm/min.

Cleavage Test Method

On the unbonded surface of a sample that includes two polycarbonate DVD substrates bonded together through an adhesive composition a circular area of about 2.5 cm in diameter is rubbed with a cotton swab treated with toluene. This treatment results in solvent attack on the unbonded side of the bonded assembly. A piece of 3M Scotch brand 851 tape (Minnesota Mining and Manufacturing (3M Company), St. Paul, Minn.) is bonded to the vertical surface of the assembly and adjacent to the solvent treated area, with the tape extending above and below the horizontal plane of the bonded assembly. About 2.5 grams of Scotch-Weld DP-420 liquid adhesive (3M Company) is dispensed onto the tape-dammed solvent treated area of the bonded assembly and spread out with a wooden spatula. A steel tee nut (0.79 cm (5/16")) 18 international thread, 1.6 cm (5/8") barrel height) is placed onto the Scotch-Weld DP-420 liquid adhesive and positioned such that the edge of the steel tee nut is coincident with the edge of the bonded assembly. Additional Scotch-Weld DP-420 liquid adhesive is dispensed so as to fully cover the collared area of the steel tee nut. The assembly is allowed to cure for four hours, after which a second steel tee nut assembly is similarly mounted on the second unbonded horizontal surface of the bonded assembly. The cleavage test specimen is then allowed to stand for 16 hours to allow for full cure of the Scotch-Weld DP-420 liquid adhesive. A 5.1 cm (2 in.) long threaded bolt is threaded into each of the steel tee nuts. The bolts are mounted into the di-opposed jaws of an Instron such that the bonded assembly is subjected to a force normal to its bondline. The joint is stressed at a rate of 0.254 cm/min and the force required to initiate separation of the bonded assembly, as measured in lbs of force to initiate cleavage, is recorded as the cleavage strength of the bonded assembly.

Storage Modulus (G') Test Method

An adhesive film having a thickness of about 2 mm is prepared by layering 40 layers of 50 μm thick adhesive film on top of each other and punching out an 8 mm disc from the adhesive tape. The sample is placed in a Dynamic RDA II rheology analyzer (Rheometric Scientific, Inc., Piscataway, N.J.) and measurements are made in parallel plate mode at a frequency of 6.28 radians/sec and a strain of 0.5%. The temperature is scanned over a predetermined temperature range at a rate of 5° C./min, with data recordings made every 20 seconds in Pascals (Pa). The storage modulus (G') values at −30° C., 23° C. and 80° C. are reported in Pa.

Optical Clarity Test Method

Optical clarity is determined using a transmission accessory mounted on a Gardner BYK Color TCS Plus (TM) spectrophotometer (BYK Gardner, Columbia, Md.). The spectrophotometer includes software capable of obtaining spectral data at 10 nm intervals from 380 to 720 nm.

The sample is prepared by cutting a 40 mm×40 mm adhesive sample from a 50 μm thick adhesive film sandwiched between a T-50 release liner having a 50 μm polyethylene terephthalate (PET)-backing coated with a silicone release compound (CPFilms, Martinsville, Va.), and a P-10 release liner having a 50 μm PET backing coated with a silicone release compound (CPFilms). One release liner is peeled away exposing the adhesive composition, which is then laid flat onto a 3M Infrared Card (Type 61) (3M Company), which has been modified by enlarging the card aperture such that the diameter of the aperture is 25 mm on each of its four sides. Using a hand held squeegee, pressure is applied to the edges of the release liner side of the adhesive film to secure the adhesive to the IR card. The second release liner is then peeled away from the adhesive film and the IR card is mounted on the transmission accessory unit such that the adhesive-coated side of the IR card is farthest from the incident radiation source. The spectral data from 380 nm to 720 nm is then obtained and the % transmission at 650 nm is reported.

AlogP and $F_{H2O}$ Determination

AlogP is a parameter that represents the hydrophobic interaction, i.e., the corresponding energy that operates between two or more solutes in water and n-octonal. AlogP=$\Sigma n_i a_i$, where $n_i$ is the number of atoms of type i in the molecule, and $a_i$ is the contribution of the corresponding atom type.

$F_{H2O}$ is a parameter that represents the aqueous dissolution free energy using a hydration shell model. $F_{H2O}=\Sigma n_i \Delta f_i$, where $n_i$ is the number of chemical fragments in a molecule of interest and $f_i$ is the aqueous dissolution free energy of the chemical fragment.

AlogP and $F_{H2O}$ values were calculated for the molecules of interest using Cerius2 (Version 3.8) QSAR+ software program (Molecular Simulations Inc.). The molecular structures are optimized with the COMPASS force field (version 98/01) (Molecular Simulations Inc.).

Figure 2:
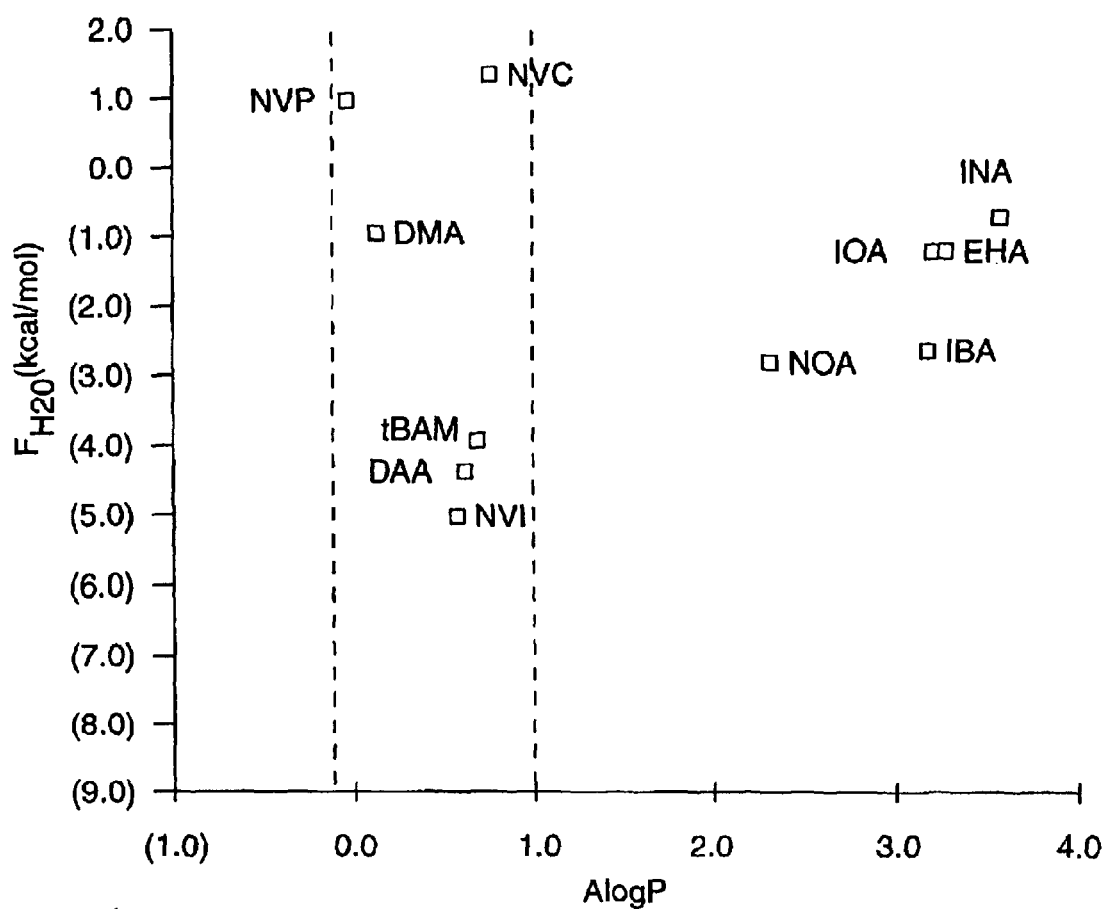
FIG. 2 is a plot of AlogP v. $F_{H2O}$ (Kcal/mol).

AlogP and $F_{H2O}$ values were obtained for each of the following monomers and are depicted in the form of the graph of FIG. 2: NVC, NVP, dimethyl acrylamide (DMA), t-butyl methacrylamide (t-BMA), diacetone acrylamide (DAA) (Aldrich, Milwaukee, Wis.), N-vinylimidazole (NVI), INA, IOA, EHA, and isobornyl acrylate (IBA) (San Esters Corp., New York, N.Y.).

DVD Performance Test Method

An article is placed in a DVD200MG Data Analyzer (DC Associates, Inc., Irvine, Calif.). The software program is activated and the article is analyzed according to the industry standard entitled, "DVD Specification for Read Only Disc Pt.1. Physical Specifications, Version 1, para. 2.7.3 Random Errors, August 1996," which provides the requirement for maximum error rate of PI errors for a DVD. A low P1 error count generally indicates that the digital transcription process is good and the disc quality is good.

If the bonded DVD article can be read by the analyzer it is deemed to have passed the DVD Performance Test.

Adhesive Preparation

Syrup Preparation 16.5 grams of 2-ethylhexyl acrylate (EHA) (Rohm & Haas, Philadelphia, Pa.) and 8.5 grams of N-vinyl caprolactam (NVC) (International Specialty Products Performance Chemicals, Wayne, N.J.) were combined to form a monomer mixture having a monomer ratio of 66:34 EHA/NVC. The monomer mixture was blended with 0.01 grams Irgacure 651 photoinitiator. Following dissolution of the photoinitiator, the mixture was purged with nitrogen gas for about two minutes and then partially photopolymerized with ultraviolet light until the viscosity had risen to a viscosity of at least 200 cps as measured using a Brookfield Viscometer with a No. 4 LTV spindle, at 60 revolutions per minute. An additional charge of 0.04 grams of Irgacure 651 photoinitiator was then added to the mixture and allowed to dissolve by agitating the composition on a roller for about 30 minutes.

Coating Method A

The syrup prepared as described above was coated between a T-50 silicone-treated, 0.05 mm (2 mil) polyethylene terephthalate (PET) release liner (CPFilms) and a P-10 silicone-treated, 0.05 mm (PET) release liner (CPFilms) using a knife-over-bed coater, and pulling the coated composite through a coating orifice that was about 50 μm greater than the combined thickness of the two release liners.

Curing Method A

A coated sample prepared according to Coating Method A was placed under a ultraviolet light assembly containing four Sylvania blacklight bulbs for a period of 4.5 minutes for a dose of 880 millijoules (NIST) of energy to form an adhesive film about 50 μm thick.

Curing Method B

A coated sample prepared according to Coating Method A was passed at a rate of 3 meters/min for a period of about 3 minutes through a UV irradiation chamber that included bulbs having a spectral output of 300 nm to 400 nm and a maximum spectral output at 351 nm, mounted above the sample, to form an adhesive film about 50 μm thick. The coated composite was passed through the chamber with the P-10 release liner as the uppermost layer (i.e., the layer directly exposed to the bulbs). The total measured dosage of energy was 550 milliJoules/cm² (NIST units).

Coating and Curing Method C

A PET release liner was unwound from a first unwind roll and passed over a free-wheeling, unheated steel backup roll 25.4 cm in diameter. A syrup prepared as described above was coated onto the release liner a coating die similar to that illustrated in FIG. 6 of Vesley et al., WO 95/29811, entitled, "Lamination Process for Coatings." The die was 91.4 cm wide and was configured with a 0.15 mm brass shim, which was 63.5 cm in length, a 0.254 mm convergence, an overbite of 0.076 mm, a coating land L1 of 12.7 mm, a vacuum land of 12.7 mm, and a die attack angle A2 of 90°. Vacuum was applied during the coating. After the coating was applied to the first release liner, a second PET release liner was unwound form a second unwind roll and passed around a 2.54 cm diameter, air pressurized sintered metal laminator bar at an air pressure in the range of 1.4 to 4.5 bar, where it was laminated to the coated face of the first release liner according to the procedure described in Vesley et al., PCT International Application No. WO 95/29766 entitled, "Precision Coating Process for Preparing Polymerizable Films," to form an uncured laminate construction.

The uncured laminate construction was cured by passing the construction under a bank of fluorescent black light lamps to form an adhesive film of about 50 μm. The laminate construction was exposed to about 2200 milliwatts/cm² of total energy (NIST units).

EXAMPLE 1

An adhesive composition was prepared as follows: syrup was prepared according to the syrup preparation method set forth above with the exception that the monomers and monomer ratio of the adhesive polymer was 66/34 isooctyl acrylate (IOA)/N-vinyl caprolactam (NVC). The syrup was then coated according to Coating Method A and cured according to Curing Method B to form an adhesive film having a thickness of about 50 μm.

Bonded articles to be tested were then prepared as follows using first and second polycarbonate substrates 120 mm in diameter, 0.6 mm in thickness, and having a 15 mm diameter center hole. The adhesive film was adhered to the first polycarbonate substrate (designated "C" in Table 1) by passing the adhesive film and the first polycarbonate substrate through a bonding nip while applying pressure causing the adhesive film to transfer to the first substrate. The second polycarbonate substrate was then adhered to the adhesive film bearing first substrate by passing the adhesive film bearing substrate and the second polycarbonate substrate through the bonding nip roller such that the adhesive coated surface of the first substrate contacted the second substrate forming a bonded article. Two large di-opposed wheels equipped with vacuum holddown pads were used in the bonding process.

EXAMPLES 2, 3, AND 5–6

Adhesive films and bonded articles were prepared as described above in Example 1 with the exception that the monomers and monomer ratio of the adhesive polymers were as follows: 65/35 isooctyl acrylate (IOA)/NVC (Example 2); 64/36 IOA/NVC (Example 3); 65/35 ethylhexyl acrylate (EHA)/NVC (Example 5); 64/36 EHA/NVC (Example 6).

EXAMPLES 4 AND 7–14

Adhesive films and bonded articles were prepared as described above in Example 1 with the exception that the monomers and monomer ratio of the adhesive polymers were as follows: 60/40 IOA/NVC (Example 4); 62/38 isononyl acrylate (INA) (Nikkon Skokubai Co. Ltd., Osaka, Japan)/NVC (Example 7); 61/39 INA/NVC (Example 8); 60/40 INA/NVC (Example 9); 55/45 INA/NVC (Example 10); 62/38 INA/NVP (Example 11); 61/39 INA/N-vinyl pyrrolidone (NVP) (International Specialty Products) (Example 12); 60/40 INA/NVP (Example 13); 60/40 IOA/ dimethyl acrylamide (DMA) (Jarchem Ind., Newark, N.J.) (Example 14). In addition, the compositions of Examples 4 and 7–14 were cured according to Curing Method A instead of Curing Method B.

The bonded articles of Examples 1–14 were exposed to 90% relative humidity at 80° C. for 16 hours, according to Accelerated Aging Test Method I, and then examined for debonding. The results are reported in Table 1.

EXAMPLES 15

An adhesive film and bonded articles was prepared as described above in Example 1, with the exception that there was a layer of aluminum (designated "Al" in Table 1) on the surface of the second polycarbonate substrate and the adhesive composition was in contact with the layer of aluminum. In addition, the monomers and monomer ratio of the adhesive polymer was as follows: 68/32 EHA/NVC.

The bonded article of Example 15 was exposed to 90% relative humidity at 80° C. for 16 hours, according to the Accelerated Aging Test Method I. The article was then examined for debonding, corrosion and pinholes. The results are reported in Table 1.

EXAMPLE 16

An adhesive film and a bonded article were prepared as described above in Example 1, with the exception that the monomers and monomer ratio of the adhesive polymers were 55/45 INA/NVC.

The bonded article of Example 16 was exposed to 90% relative humidity at 80° C., according to the Accelerated Aging Test Method I with the exception that the duration of the test was 1000 hours instead of 16 hours. The article was then examined for debonding, corrosion and pinholes. The results are reported in Table 1.

EXAMPLES 17 AND 18

Bonded articles were prepared as described above in Example 1 with the exception that there was a layer of aluminum on the surface of the first polycarbonate substrate, a layer of silicon dioxide (designated "ST" in Table 1) on a surface of the second polycarbonate substrate, and the adhesive composition was in contact with the layers of aluminum and silicon dioxide. In addition, the monomers and monomer ratio of the adhesive polymers were as follows: 60/40 INA/NVC (Example 17); 65/35 INA/NVC (Example 18).

The bonded articles of Examples 17 and 18 were exposed to 90% relative humidity at 80° C., according to the Accelerated Aging Test Method I with the exception that the duration of the test was 1000 hours instead of 16 hours. The articles were then examined for debonding, corrosion and pinholes. The results are reported in Table 1.

EXAMPLES 19–22

Bonded articles were prepared as described above in Example 1 with the exception that there was a layer of aluminum on the surface of the first polycarbonate disc, a layer of silicon dioxide on a surface of the second polycarbonate disc, and the adhesive composition was in contact with the layers of aluminum and silicon dioxide. In addition, the monomers and monomer ratio of the adhesive polymers were as follows: 66/34 EHA/NVC (Examples 20 and 21); and 64/34/0.4 EHA/NVC/triethyl silane ((Et$_3$)SiH) chain transfer agent (Example 22). In addition, Curing and Coating Method C was used instead of Curing Method A and Coating Method B.

The bonded articles of Examples 19–22 were exposed to 90% relative humidity at 80° C. according to the Accelerated Aging Test Method I with the exception that the duration of the test was 900 hours instead of 16 hours. The articles were then examined for debonding, corrosion, and pinholes. The results are reported in Table 1.

EXAMPLES 23–27

Bonded articles were prepared according to Example 1 with the exception that the first and second substrates both included a surface layer of aluminum and the adhesive composition was in contact with the aluminum layers. In addition, the monomers and monomer ratio of the adhesive polymers were as follows: 68/32 IOA/NVC (Example 23); 66/34 IOA/NVC (Example 24); 64/36 IOA/NVC (Example 25); 62/38 IOA/NVC (Example 26); and 60/40 (Example 27).

The bonded articles of Examples 23–27 were tested according to the Cleavage Test Method. The results are set forth in lbs of force to initiate cleavage in Table 2.

EXAMPLES 28–31

Bonded articles were prepared according to Example 1 with the exception that the first substrate included a surface layer of aluminum and the second substrate included a surface layer of silicon dioxide. The adhesive composition was in contact with the aluminum surface of the first substrate and the silicon dioxide surface of the second substrate. In addition, the monomers and monomer ratio of the adhesive polymers were as follows: 68/32 EHA/NVC (Example 28); 55/45 IOA/NVC (Example 29); 70/30 IOA/NVC (Example 30); 68/32 IOA/NVC (Example 31).

The bonded articles of Examples 28–31 were tested according to the Cleavage Test Method. The results are set forth in lbs of force to initiate cleavage in Table 2.

EXAMPLES 32–38

Adhesive films were prepared according to Example 1, and were tested according to the Storage Modulus Test Method. Values of G' at −30° C., 23° C., and 80° C. are set forth in Pascals (Pa) in Table 3A.

Examples 32–38 were also tested according to the 90° and 180° Peel Adhesion Test Method at 15 minutes and 72 hours. The results are set forth in Oz/in in Table 3B.

EXAMPLES 39–43

Adhesive films were prepared according to Example 1 with the exception that the following monomers and monomer ratios were used: 68/32 IOA/NVC (Example 39); 66/34 IOA/NVC (Example 40); 68/32 EHA/NVC (Example 41); 66/34 EHA/NVC (Example 42); 61/39 INA/NVC (Example 43).

The adhesive films of Examples 39–43 were then tested for optical clarity according to the Optical Clarity Test Method. The results obtained at 650 nm are reported in % Transmission in Table 4.

EXAMPLES 44–47

Bonded articles were prepared according to Example 1 with the exception that t-butyl acrylamide (t-BAA) was included in the reaction that produced the adhesive polymer. In addition, the monomers and monomer ratios were as follows: 60/35/5 EHA/NVC/t-BAA (Example 44); 60/35/5 IOA/NVC/t-BAA (Example 45); 60/35/5 INA/NVC/t-BAA (Examples 46 and 47).

The bonded articles in Examples 44–47 were exposed to 90% relative humidity at 80° C. for 16 hours according to Accelerated Aging Test Method I, and then examined for debonding, haze and pinholes. The results are reported in Table 5.

EXAMPLES 48–56

21.0 grams of IOA and 9.0 grams of N-vinyl caprolactam (NVC) having a monomer ratio of 70/30 (IOA/NVC) were blended with 0.01 grams Irgacure 651 photoinitiator. The mixture was then purged with nitrogen gas for about two minutes and then partially photopolymerized with ultraviolet light until the viscosity had risen to at least 200 cps as measured using a Brookfield Viscometer. An additional charge of 0.04 grams of Irgacure 651 photoinitiator was then added to the mixture and allowed to dissolve by agitating the composition on a roller for about 30 minutes.

The articles were then prepared according to Coating Method A and Curing Method B. The structure of the articles of each example is indicated in Table 6, with where the abbreviations are as follows: C=clear polycarbonate disc, A=adhesive, Al=a substrate that includes a layer of aluminum in contact with the adhesive composition, and ST=a substrate that includes a semitransparent layer in contact with the adhesive composition.

The samples were then subjected to the Accelerated Aging Test Method II. The results are reported in Table 6.

EXAMPLES 57–65

The articles were prepared as described above in Examples 48–56, respectively, with the exception that the adhesive composition included EHA/NVC in a monomer ratio of 68/32. The structures of the articles of Examples 57–65 were as indicated in Table 6 and as defined above in Examples 48–56.

The samples were then subjected to the Accelerated Aging Test Method II. The results are reported in Table 6.

EXAMPLES 66A AND 66B

A disc-shaped EHA/NVC 64/34 adhesive film sandwiched between two silicone treated PET release liners to form an adhesive article, was prepared according to Example 19. Bonded articles were then prepared using the EHA/NVC 64/34 adhesive film as follows.

A disc-shaped polycarbonate substrate suitable for a DVD disc having a recording capacity of 8 gigabytes, an outer diameter of 120 mm, a thickness of 12 mm and a central hole 15 mm in diameter, was prepared by injection molding polycarbonate into a mold defining a master disc according to the procedure described in EP 729,141, col. 6, 11. 14–46. The disc-shaped polycarbonate substrate had a first major surface and a second major surface opposite the first major surface that included pits (i.e., information) created by the injection molding process used to form the disc. An approximately 50 nm thick aluminum layer was sputter coated onto the structure of pits on the second major surface as described in EP 729,141, col. 6, 11. 47–55.

The bonded DVD article was prepared using a three chamber vacuum as follows. A semitransparent disc was placed in a first vacuum chamber and centered on a top vacuum plate while vacuum was applied to the first chamber. The first liner of the disc-shaped adhesive article was removed from the adhesive article to expose the adhesive film. The surface of the adhesive article that included the second release was then placed on a bottom vacuum plate (release liner side down) in a second chamber while applying vacuum. The chambers were then closed via a pneumatic closing system to form a third vacuum chamber. The third vacuum chamber was evacuated to about 0.08 millibars of pressure. The lower vacuum chamber was pressurized to about 1 bar causing the bottom vacuum plate to rise such that the adhesive surface of the disc-shaped adhesive article contacted the metallized data containing semitransparent surface of the polycarbonate disc. The assembly was held in this configuration for about three seconds, at which time the vacuum to the top plate was released. The second chamber was then evacuated to about 0.08 millibars causing the lower bonding plate and the bonded assembly now thereon to be separated from the top vacuum plate. The bonded assembly was then removed and placed on the top vacuum plate. The second release liner was then removed, exposing the adhesive film. The aluminum surface of a second polycarbonate disc located on the bottom plate was then brought in contact with the exposed adhesive film as described above to form the bonded DVD article.

The bonded DVD article (Example 66A) was then tested according to the DVD Performance Test Method. The DVD article was capable of being read by the optical reader and passed the test.

A second bonded DVD article (Example 66B) was subjected to 100 hours of accelerated aging at 85% relative humidity and 80° C. and then tested according to the DVD Performance Test Method. The DVD article was capable of being read by the optical reader and passed the test.

Latex Polymerization Method 150 grams deionized (DI) water, 0.75 g Rhodacal DS-10 sodium dodecyl benzene sulfonate surfactant (Rhone-Poulenc), 33 g EHA, and 17 g NVC were charged to a 4-neck flask equipped with a reflux condenser, thermometer, stirrer, and a nitrogen gas inlet. The reaction mixture was stirred and heated to 60° C. under $N_2$ atmosphere. When the batch temperature leveled off at 60° C., the 0.10 g potassium persulfate initiator was added to the reactor to initiate the polymerization. After one hour of reaction at 60° C., the batch temperature was increased to 70° C. The reaction was continued at the temperature for two hours to complete the polymerization and form a 2EHA/NVC (66/34) latex composition. After the reaction, the batch was cooled to room temperature and the latex was filtered through a cheesecloth to remove coagulum, if present in the batch.

100 g of the EHA/NVC (66/34) composition, 0.8 Triton GR5M dioctyl sodium sulfosuccinate (Union Carbide), 1.0 g Polyphobe 101 (Union Carbide) and 0.3 g ammonium hydroxide were mixed together to increase viscosity and lower the surface tension of the latex composition.

The latex polymer was then poured onto a T-50 release liner having a 50 μm PET backing coated with a silicone release compound (CPFilms, Martinsville, Va.), and pulled through a knife-over-bed coating station by hand. The gap between the knife and the bed was set to be 254 μm greater than the thickness of the backing. The coated film was air dried at room temperature for about five minutes and then placed in a forced air oven set at 65° C. for 10 minutes. The oven setting was then raised to 121° C. and maintained at that temperature for about 10 minutes. The temperature was then raised to 149° C. and held at temperature for 20 minutes at which time it was removed from the oven and allowed to cool to room temperature in the form of a latex adhesive film. Upon reaching room temperature the dried latex adhesive film was covered with P10 release liner having a 50 μm PET backing coated with a silicone release compound (CPFilms).

Upon unaided eye inspection, the adhesive film was optically clear.

EXAMPLE 67

The above dried latex adhesive film was laminated to a clear polycarbonate disc and then contacted with a second clear polycarbonate disc to form a bonded article.

The bonded article was observed to be optically clear by unaided eye inspection.

EXAMPLE 68

A second bonded article was prepared according to the method of Example 67, with the exception that one of the substrates was a clear polycarbonate disc and the other substrate was a polycarbonate disc that included an aluminum surface layer.

The article was visually examined. The bonded article was free of debonds and the aluminum surface was reflective.

Solution Polymerization Method 97.84 g of isooctyl acrylate, (IOA) 48.26 g N-vinyl caprolactam, 35.75 g isopropyl alcohol, 143.0 g ethyl acetate and 0.2925 g Vazo 67 thermal initiator (DuPont) were combined in a 1 liter bottle. The contents were then deoxygenated by purging with nitrogen for 2 minutes using a flow rate of 1 liter per minute. The bottle was sealed and placed in a rotating water bath at 57° C. for 24 hours to effect polymerization. The resultant polymer had a measured inherent viscosity of 0.238 dl/g in ethyl acetate at 0.15 g/dl concentration. Per cent solids were measured at 43.07%.

Coating and Drying of Solution Polymer

A portion of the above solution polymer was poured onto a 50 μm thick Furon B22 release liner (a PET film coated with a silicone release coating, (Furon Company, Worcester, Mass.)) and pulled through a knife-over-bed coating station, by hand. The gap between the knife and bed was set to be 254 μm greater than the thickness of the backing. The coated adhesive film was allowed to air dry for 10 minutes and then placed in a forced air oven at a temperature of 65° C. The temperature was increased to 121° C. over a period of five minutes and then held at 121° C. for 20 minutes. The adhesive film was removed from the oven and allowed to cool to room temperature, at which time it was covered with a P-10 release liner (50 μm thick PET film coated with a silicone release coating which has a lower level of adhesion toward the dried adhesive film vs the Furon B22 release liner). A portion of the adhesive film was removed from the release liner and, when inspected by the unaided eye, was found to be optically clear.

Bonding of Solution Polymer Adhesive Film

Bonded articles to be tested were then prepared as follows using first and second polycarbonate substrates 120 mm in diameter, 0.6 mm in thickness, and having a 15 mm diameter center hole. The adhesive film was adhered to the first polycarbonate substrate by passing the adhesive film and the first polycarbonate substrate through a bonding nip while applying pressure causing the adhesive film to transfer to the first substrate. The second polycarbonate substrate was then adhered to the adhesive film bearing first substrate by passing the adhesive film bearing substrate and the second polycarbonate substrate through the bonding nip roller such that the adhesive film coated surface of the first substrate contacted the second substrate forming a bonded article. Two large di-opposed wheels equipped with vacuum hold-down pads were used in the bonding process.

The bonded article was observed by the unaided eye and was found to be optically clear.

TABLE 1

| Example | Components | Formulation | Article | Conditions | Debonds | Corrosion | Pinholes |
|---|---|---|---|---|---|---|---|
| 1 | IOA/NVC | 66/34 | C/A/C[1] | 80° C. | NONE | NA[4] | NA |
| 2 | IOA/NVC | 65/35 | C/A/C | 90% RH | NONE | NA | NA |
| 3 | IOA/NVC | 64/36 | C/A/C | 16 HOURS | NONE | NA | NA |
| 4 | IOA/NVC | 60/40 | C/A/C | | NONE | NA | NA |
| 5 | EHA/NVC | 65/35 | C/A/C | | NONE | NA | NA |
| 6 | EHA/NVC | 64/36 | C/A/C | | NONE | NA | NA |
| 7 | INA/NVC | 62/38 | C/A/C | | NONE | NA | NA |
| 8 | INA/NVC | 61/39 | C/A/C | | NONE | NA | NA |
| 9 | INA/NVC | 60/40 | C/A/C | | NONE | NA | NA |
| 10 | INA/NVC | 55/45 | C/A/C | | NONE | NA | NA |
| 11 | INA/NVP | 62/38 | C/A/C | | NONE | NA | NA |
| 12 | INA/NVP | 61/39 | C/A/C | | NONE | NA | NA |
| 13 | INA/NVP | 60/40 | C/A/C | | NONE | NA | NA |
| 14 | IOA/DMA | 60/40 | C/A/C | | NONE | NA | NA |
| 15 | EHA/NVC | 68/32 | C/A/Al[2] | | NONE | NT[5] | NT |
| 16 | INA/NVC | 55/45 | C/A/C | 80° C. | NONE | NONE | 6 |
| 17 | INA/NVC | 60/40 | Al/A/ST[3] | 90% RH | NONE | NONE | NONE |
| 18 | INA/NVC | 65/35 | Al/A/ST | 1000 hrs | NONE | NONE | 2 |
| 19 | EHA/NVC | 66/34 | Al/A/C | 80° C. | NONE | NONE | 5 |
| 20 | EHA/NVC | 66/34 | Al/A/ST | 90% RH | NONE | NONE | 1 |
| 21 | EHA/NVC | 66/34 | Al/A/ST | 900 hrs | NONE | NONE | 2 |
| 22 | EHA/NVC/(Et$_3$)SiH | 66/34/0.4 | Al/A/ST | | NONE | NONE | 3 |

[1]C = polycarbonate and A = adhesive
[2]Al = aluminum
[3]ST = Semitransparent
[4]NA = not applicable
[5]NT = not tested

TABLE 2

| Example | Components | Formulation | Article | Cleavage (lbs of force to initiate cleavage) |
|---|---|---|---|---|
| 23 | IOA/NVC | 68/32 | Al/A/Al | 209 |
| 24 | IOA/NVC | 66/34 | Al/A/Al | 240, 260 |
| 25 | IOA/NVC | 64/36 | Al/A/Al | 254, 300 |
| 26 | IOA/NVC | 62/38 | Al/A/Al | 332 |
| 27 | IOA/NVC | 60/40 | Al/A/Al | 334 |
| 28 | EHA/NVC | 68/32 | Al/A/ST | 205, 198, 240 |
| 29 | INA/NVC | 55/45 | Al/A/ST | 282 |
| 30 | IOA/NVC | 70/30 | Al/A/ST | 305 |
| 31 | IOA/NVC | 68/32 | Al/A/ST | 242, 255 |

TABLE 3A

| Example | Components | Formulation | G' @ -30° C. (Pa) 1*10$^8$ | G' @ 23° C. (Pa) 1*10$^5$ | G' @ 80° C. (Pa) 1*10$^4$ |
|---|---|---|---|---|---|
| 32 | IOA/NVC | 66/34 | 4.8 | 14.9 | 10.1 |
| 33 | IOA/NVC | 65/35 | 4.63 | 15.1 | 10.8 |
| 34 | IOA/NVC | 64/36 | 4.27 | 15.1 | 9.34 |
| 35 | EHA/NVC | 66/34 | 2.83 | 6.06 | 9.36 |
| 36 | EHA/NVC | 65/35 | 3.33 | 5.25 | 9.05 |
| 37 | EHA/NVC | 64/36 | 3.1 | 5.45 | 9.29 |
| 38 | INA/NVC | 61/39 | 3.96 | 27.2 | 17.5 |

TABLE 3B

| | | 90° Peel Adhesion to SS[1] (Oz/in) | | 180° Peel Adhesion (Oz/in) | | | | | | |
|---|---|---|---|---|---|---|---|---|---|---|
| | | | | C[2] | | C | | Al/C[3] | Al/C | ST/C[4] | ST/C |
| Example | Formulation | 15 min | 72 hr | 15 min | 72 hr | 15 min | 72 hr | 15 min | 72 hr | 15 min | 72 hr |
| 32 | IOA/NVC | 61.8 | 87.2 | 50.2 | 63 | 22 | 59.8 | 28 | 56.7 |
| 33 | IOA/NVC | 62.4 | 81.4 | 71.6 | 94.8 | NT[5] | NT | NT | NT |
| 34 | IOA/NVC | 42.8 | 77.8 | 31.2 | NT | NT | NT | NT | NT |
| 35 | EHA/NVC | 55.2 | 72.8 | 69.9 | 82 | 50.4 | 70.9 | 58.1 | 68.4 |

TABLE 3B-continued

| | | 90° Peel Adhesion to SS[1] (Oz/in) | | 180° Peel Adhesion (Oz/in) | | | | | |
|---|---|---|---|---|---|---|---|---|---|
| | | | | C[2] | | C | Al/C[3] | Al/C | ST/C[4] | ST/C |
| Example | Formulation | 15 min | 72 hr | 15 min | 72 hr | 15 min | 72 hr | 15 min | 72 hr |
| 36 | EHA/NVC | 57.6 | 65.2 | NT | NT | NT | NT | NT | NT |
| 37 | EHA/NVC | 60.2 | 75.6 | NT | NT | NT | NT | NT | NT |
| 38 | INA/NVC | 18.6 | 33.2 | 27.8 | 61.8 | 25.6 | 54 | 23.1 | 55.6 |

[1] = stainless steel
[2] = peel adhesion to a polycarbonate substrate
[3] = peel adhesion to the aluminum surface of a polycarbonate substrate
[4] = peel adhesion to the semitransparent surface of a polycarbonate substrate
[5] NT = not tested

TABLE 4

| Example | Components | Formulation | % Transmission |
|---|---|---|---|
| 39 | IOA/NVC | 68/32 | 92.85 |
| 40 | IOA/NVC | 66/34 | 92.72 |
| 41 | EHA/NVC | 68/32 | 92.81 |
| 42 | EHA/NVC | 66/34 | 92.72 |
| 43 | INA/NVC | 61/39 | 92.22 |

TABLE 5

| Example | Components | Formulation | Conditions | Result |
|---|---|---|---|---|
| 44 | EHA/NVC/t-BAA | 60/35/5 | 85° C., 85% RH, 16 hours | no debonding or haze |
| 45 | IOA/NVC/t-BAA | 60/35/5 | 85° C., 85% RH, 16 hours | no debonding or haze |
| 46 | INA/NVC/t-BAA | 60/35/5 | 85° C., 85% RH, 16 hours | no debonding or haze |
| 47 | INA/NVC/t-BAA | 60/35/5 | 85° C., 85% RH, 16 hours | no debonding or haze |

TABLE 6

| Example | Components | Formulation | Article | Debonds | Corrosion | Pinholes |
|---|---|---|---|---|---|---|
| 48 | IOA/NVC | 70/30 | C/A/Al | NONE | NONE | 2 |
| 49 | IOA/NVC | 70/30 | C/A/Al | NONE | NONE | NONE |
| 50 | IOA/NVC | 70/30 | C/A/Al | NONE | NONE | NONE |
| 51 | IOA/NVC | 70/30 | Al/A/Al | NONE | NONE | NONE |
| 52 | IOA/NVC | 70/30 | Al/A/Al | NONE | NONE | NONE |
| 53 | IOA/NVC | 70/30 | Al/A/Al | NONE | NONE | NONE |
| 54 | IOA/NVC | 70/30 | Al/A/ST | NONE | NONE | NONE |
| 55 | IOA/NVC | 70/30 | Al/A/ST | NONE | NONE | NONE |
| 56 | IOA/NVC | 70/30 | Al/A/ST | NONE | NONE | NONE |
| 57 | EHA/NVC | 68/32 | C/A/Al | NONE | NONE | 16 |
| 58 | EHA/NVC | 68/32 | C/A/Al | NONE | NONE | 2 |
| 59 | EHA/NVC | 68/32 | C/A/Al | NONE | NONE | NONE |
| 60 | EHA/NVC | 68/32 | Al/A/Al | NONE | NONE | NONE |
| 61 | EHA/NVC | 68/32 | Al/A/Al | NONE | NONE | NONE |
| 62 | EHA/NVC | 68/32 | Al/A/Al | NONE | NONE | NONE |
| 63 | EHA/NVC | 68/32 | Al/A/ST | NONE | NONE | NONE |
| 64 | EHA/NVC | 68/32 | Al/A/ST | NONE | NONE | NONE |
| 65 | EHA/NVC | 68/32 | Al/A/ST | NONE | NONE | NONE |

Other embodiments are within the following claims.

What is claimed is:

1. An adhesive composition consisting essentially of an adhesive polymer consisting of the reaction product of 1) greater than 30 parts by weight N-vinyl caprolactam based on 100 parts by weight of adhesive polymer;
2) an acrylic acid ester monomer of a non-tertiary alcohol having an alkyl group comprising 4 to 20 carbon atoms, whose homopolymer has a Tg less than 0° C.;
3) a photo initiator.

2. The composition of claim 1, wherein said adhesive composition is capable of maintaining a first polycarbonate substrate in fixed relation to a second polycarbonate substrate to form an article that is substantially free of debonding after said article is subjected to Accelerated Aging Test Method II.

3. The composition of claim 1, wherein said adhesive composition is capable of bonding a first polycarbonate substrate to a second polycarbonate substrate to form an article that is substantially free of debonding after exposure to 90% relative humidity at 80° C. for 16 hours.

4. The composition of claim 1, wherein said adhesive composition is capable of bonding a first polycarbonate substrate comprising a metal layer disposed on a surface of said polycarbonate, to a second polycarbonate substrate to form an article that is substantially free of corrosion after exposure to 90% relative humidity at 80° C. for 16 hours.

5. The composition of claim 1, wherein said adhesive composition has a storage modulus of at least about $2 \times 10^5$ Pa at room temperature.

6. The composition of claim 1, wherein the amount of said N-vinyl caprolactam is from about 33 parts by weight to about 50 parts by weight based on 100 parts by weight of adhesive polymer.

7. The composition of claim 1, wherein said acrylic acid ester monomer is selected from the group consisting of isooctyl acrylate, 2-ethylhexyl acrylate, isononyl acrylate, isodecyl acrylate, decyl acrylate, lauryl acrylate, hexyl acrylate, butyl acrylate, octadecyl acrylate, and combinations thereof.

8. The composition of claim 1, wherein said adhesive composition is optically clear.

9. The composition of claim 1, wherein said adhesive composition is optically clear when disposed between a first polycarbonate substrate and a second polycarbonate substrate and then exposed to 90% relative humidity at 80° C. for 16 hours.

10. An article comprising:
   a first polyethylene terephthalate substrate comprising silicone disposed on a surface thereof;
   a second polyethylene terephthalate substrate comprising silicone disposed on a surface thereof, wherein said first substrate is different from said second substrate; and
   a pressure sensitive adhesive composition according to claim 1 disposed between said first substrate and said second substrate.

11. An adhesive composition consisting essentially of an adhesive polymer consisting of the reaction product of
   1) greater than 30 parts by weight N-vinyl caprolactam based on 100 parts by weight of adhesive polymer;
   2) an acrylic acid ester monomer of a non-tertiary alcohol having an alkyl group comprising 4 to 20 carbon atoms, whose homopolymer has a Tg less than 0° C.;
   3) optionally a monoethylenically unsaturated monomer having an alkyl group comprising from 4 to 20 carbon, whose homopolymer has a Tg of greater than 10° C.;
   4) t-butyl acrylamide;
   5) a photoinitiator;
   6) optionally a cross-linking agent; and
   7) optionally a chain transfer agent.

12. The composition of claim 11, wherein said adhesive composition is capable of maintaining a first polycarbonate substrate in fixed relation to a second polycarbonate substrate to form an article that is substantially free of debonding after said article is subjected to Accelerated Aging Test Method II.

13. The composition of claim 11, wherein said adhesive composition is capable of bonding a first polycarbonate substrate to a second polycarbonate substrate to form an article that is substantially free of debonding after exposure to 90% relative humidity at 80° C. for 16 hours.

14. The composition of claim 11, wherein said adhesive composition is capable of bonding a first polycarbonate substrate comprising a metal layer disposed on a surface of said polycarbonate, to a second polycarbonate substrate to form an article that is substantially free of corrosion after exposure to 90% relative humidity at 80° C. for 16 hours.

15. The composition of claim 11, wherein said adhesive composition has a storage modulus of at least about $2 \times 10^5$ Pa at room temperature.

16. The composition of claim 11, wherein the amount of said N-vinyl caprolactam is from about 33 parts by weight to 50 parts by weight based on 100 parts by weight of adhesive polymer.

17. The composition of claim 11, wherein said acrylic acid ester monomer is selected from the group consisting of isooctyl acrylate, 2-ethylhexyl acrylate, isononyl acrylate, isodecyl acrylate, decyl acrylate, lauryl acrylate, hexyl acrylate, butyl acrylate, octadecyl acrylate, and combinations thereof.

18. The composition of claim 11, wherein said adhesive polymer consists of the reaction product of said N-vinyl caprolactam, said acrylic acid ester monomer, a photoinitiator, and a crosslinking agent.

19. The composition of claim 11, wherein said adhesive polymer consists of the reaction product of said N-vinyl caprolactam, said acrylic acid ester monomer, a photoinitiator, a crosslinking agent, and a chain transfer agent.

20. The composition of claim 11, wherein said adhesive composition is optically clear.

21. The composition of claim 11, wherein said adhesive composition is optically clear when disposed between a first polycarbonate substrate and a second polycarbonate substrate and then exposed to 90% relative humidity at 80° C. for 16 hours.

22. An article comprising:
   a first polyethylene terephthalate substrate comprising silicone disposed on a surface thereof;
   a second polyethylene terephthalate substrate comprising silicone disposed on a surface thereof, wherein said first substrate is different from said second substrate; and
   a pressure sensitive adhesive composition according to claim 11 disposed between said first substrate and said second substrate.

* * * * *

UNITED STATES PATENT AND TRADEMARK OFFICE
CERTIFICATE OF CORRECTION

PATENT NO. : 6,815,035 B2  
DATED : November 9, 2004  
INVENTOR(S) : Bennett, Richard E. et al.

It is certified that error appears in the above-identified patent and that said Letters Patent is hereby corrected as shown below:

Title page,  
Item [57], ABSTRACT,  
Line 13, delete "N-vinylimidazole" and insert -- N-vinyl imidazole --.

Column 2,  
Line 2, delete "mm" and insert -- nm --.  
Line 44, delete "N-vinylimidazole" and insert -- N-vinyl imidazole --.

Column 7,  
Line 3, delete "N-vinylimidazole" and insert -- N-vinyl imidazole --.

Column 8,  
Line 41, delete "Hawthome" and insert -- Hawthorne --.

Column 12,  
Line 17, delete "N-vinylimidazole" and insert -- N-vinyl imidazole --.

Column 22,  
Line 23, delete "photo initiator" and insert -- photoinitiator --.

Column 24,  
Line 13, after "to" insert -- about --.

Signed and Sealed this

Seventh Day of March, 2006

JON W. DUDAS  
*Director of the United States Patent and Trademark Office*